United States Patent [19]

Takagi et al.

[11] Patent Number: 5,170,247
[45] Date of Patent: Dec. 8, 1992

[54] WHITE BALANCE ADJUSTING SYSTEM INCLUDING A COLOR TEMPERATURE VARIATION DETECTOR FOR A COLOR IMAGE PICKUP APPARATUS

[75] Inventors: Yasushi Takagi; Takuya Imaide, both of Yokohama, Japan

[73] Assignee: Hitachi, Ltd., Tokyo, Japan

[21] Appl. No.: 642,538

[22] Filed: Jan. 17, 1991

[30] Foreign Application Priority Data

Jan. 17, 1990 [JP] Japan .................................... 2-6194

[51] Int. Cl.[5] ............................................... H04N 9/73
[52] U.S. Cl. ...................................... 358/29; 358/41; 358/44
[58] Field of Search ......................... 358/29 C, 41, 44

[56] References Cited

U.S. PATENT DOCUMENTS

| 4,562,459 | 12/1985 | Sokei ................................. 358/29 C |
| 4,727,413 | 2/1988 | Miura et al. ...................... 358/29 C |
| 4,797,733 | 1/1989 | Takagi et al. . |
| 4,883,360 | 11/1989 | Kawada et al. ................. 358/29 C |
| 4,931,856 | 6/1990 | Hieda et al. ...................... 358/44 |
| 4,987,482 | 1/1991 | Imai et al. ........................ 358/41 |

FOREIGN PATENT DOCUMENTS

| 60-186188 | 9/1985 | Japan .............................. 358/29 C |
| 63-109686 | 5/1988 | Japan . |
| 63-228893 | 9/1988 | Japan . |
| 64-24587 | 1/1989 | Japan . |

Primary Examiner—Edward L. Coles, Sr.
Assistant Examiner—Kim Yen Vu
Attorney, Agent, or Firm—Antonelli, Terry Stout & Kraus

[57] ABSTRACT

Operational amplifiers detect deviations from white in pictures picked up based on color-difference signals and generate white balance control signals, respectively. The data that correspond to the generated white balance control signals are held at counters. The data that should be held at the counters are updated successively according to a synchronization signal which is applied successively to the counters. Gains of variable gain amplifiers (3r, 3b) that amplify red and blue color signals are controlled, respectively, based on the data held at the counters. A color temperature detection circuit detects a difference between a level of white balance control signal and a level expressed by the data held at the counter and generates a color temperature variation detection signal when the difference exceeding a predetermined level exists. In the event the color temperature variation detection signal is generated, a synchronization signal whose cycle is shorter than a cycle of synchronization signal that has been applied until that time is applied to the counters for a predetermined amount of time to accelerate the speed of updating data that should be held at the counters.

11 Claims, 4 Drawing Sheets

W Ye Cy G Mg R B

W Ye Cy G Mg R B

WHITE BALANCE ADJUSTING SYSTEM INCLUDING A COLOR TEMPERATURE VARIATION DETECTOR FOR A COLOR IMAGE PICKUP APPARATUS

BACKGROUND OF THE INVENTION

The present invention relates to a white balance adjusting system for a color image pickup apparatus, for example, a color video camera.

As described in Japanese Patent Application Laid Open No. 63-109686, the time-wise response characteristics of white balance adjusting against color temperature variation of illumination in conventional white balance adjusting system are determined by time constant of low pass filter which integrates a color-difference signal inside the white balance adjusting circuit and by counter-drive pulse cycle, while these response characteristics remain fixed.

In addition, as described in U.S. Pat. No. 4,797,733, conventional systems extract the signal for a portion which is considered as white (or achromatic) in the image picture and control the gain of red color signal R and blue color signal B in the signal path, so that the ratio between red and blue color signals R and B in an averaged signal for this portion will be equal (R−B=0) and that it will be parallel to the locus of color temperature variation according to blackbody radiation. FIG. 6 is a vector diagram of chrominance signal. In FIG. 6, the locus of color temperature variation due to blackbody radiation is shown using a thick full line. Furthermore, in such conventional system, generation of control signal for white balance adjusting had been performed by comparing the averaged signal (voltage) of the white portion with a reference signal (voltage) corresponding to R−B (=0) at a certain color temperature.

SUMMARY OF THE INVENTION

In the conventional technology, there is difficulty in terms of compatibility between securing tracking for abrupt change in condition of illumination and securing stability against infiltration of chromatic objects in the picture, which gave rise to a problem of oversensitivity towards panning and moving objects when the speed of control is increased by giving priority to tracking and lack of smoothness in movement from sunny area to shaded area when control is slowed down by giving priority to stability.

An object of the present invention is to provide a white balance adjusting system that realizes compatibility between stability during normal use and quick response at the time of change in illumination.

In addition, the conventional technology offers proper control when white (or achromatic) portion which is effective for white balance adjusting exists in the image picture but fixes the control to the reference adjusting state when a portion that can be considered as white does not exist in the entire picture. Although the reference adjusting is set to 4000°–5000° K., for instance, from the viewpoint of range of color temperature variation for practical illumination, it had a problem of increase in error depending on the type of illumination when there is no white portion in the picture and automatic adjusting did not function as mentioned above.

Another object of the present invention is to provide a white balance adjusting system which extracts portions that can be regarded as white and performs accurate white balance adjusting, even under imaging conditions where white portion does not exist at all.

Moreover, conventional automatic white balance adjusting system using digital counter is able to offer high-precision white balance adjusting during normal function because it owned a loop gain that is almost infinite, but is limited in terms of freedom such as in setting the system at slightly lower precision.

Still another object of the present invention is to provide an accurate white balance adjusting system that possesses freedom in terms of control precision by placing a limit to this loop gain.

The object will be accomplished according to the present invention by providing a white balance adjusting system which comprises a circuit which detects deviations from white in pictures that are picked up based on image signal supplied from an image sensor and generates a white balance control signal based on the result of detection, a circuit which holds data that correspond to the white balance control signal that has been generated and which consecutively updates data that need to be held based on synchronization signal that is applied consecutively to this hold circuit, a circuit which controls gain in color signal within image signal on the basis of the data held at the hold circuit, a circuit which detects the difference between the level of the white balance control signal and the level expressed by data held at the hold circuit and generates a detection signal when difference exceeding a predetermined value exists, and a circuit which shortens the cycle of synchronization signal that is applied to the hold circuit based on the detection signal for a predetermined period of time.

The another object of the present invention will be accomplished according to the present invention by providing a white balance adjusting system which comprises a circuit which detects a white portion in a picture based on a color information signal and a luminance information signal of a picture picked up by image sensor, a circuit which extracts the signal portion that corresponds to the white portion from the color information signal based on detection signal supplied by the white portion detection circuit, a circuit which detects deviation from white in a picture that has been picked up based on the extracted white portion signal and generates white balance control signal based on the result of detection, and a circuit which controls the gain in color signal within image signal that represents an image based on the white balance control signal that has been generated, wherein the threshold for detecting the white portion of color information signal and luminance information signal, which is necessary for detecting the white portion of a picture, is variable.

The still another object of the present invention will be accomplished according to the present invention by providing a white balance adjusting system which includes a feedback route which feeds back a signal that corresponds to white balance control data held by a hold circuit to a white balance deviation detection circuit, and a circuit that changes the white balance reference point for detecting deviation in white balance based on the fed-back signal.

DETAILED DESCRIPTION OF EMBODIMENTS

The first embodiment of the present invention is explained below with reference to FIG. 1.

In this embodiment, white balance adjusting is performed based on the principle described below.

Generally speaking, various colors are contained in an object which is picked up. Therefore, superposing all of these colors on each other will most likely produce a color which is close to white. On the other hand, the level of color-difference signal will be zero when a white object is picked up. Accordingly, the white balance is expected to be adjusted properly if the averaged value of color-difference signal over a certain period (normally, at least one field period, and at most ten field periods) becomes zero.

Figure 1:
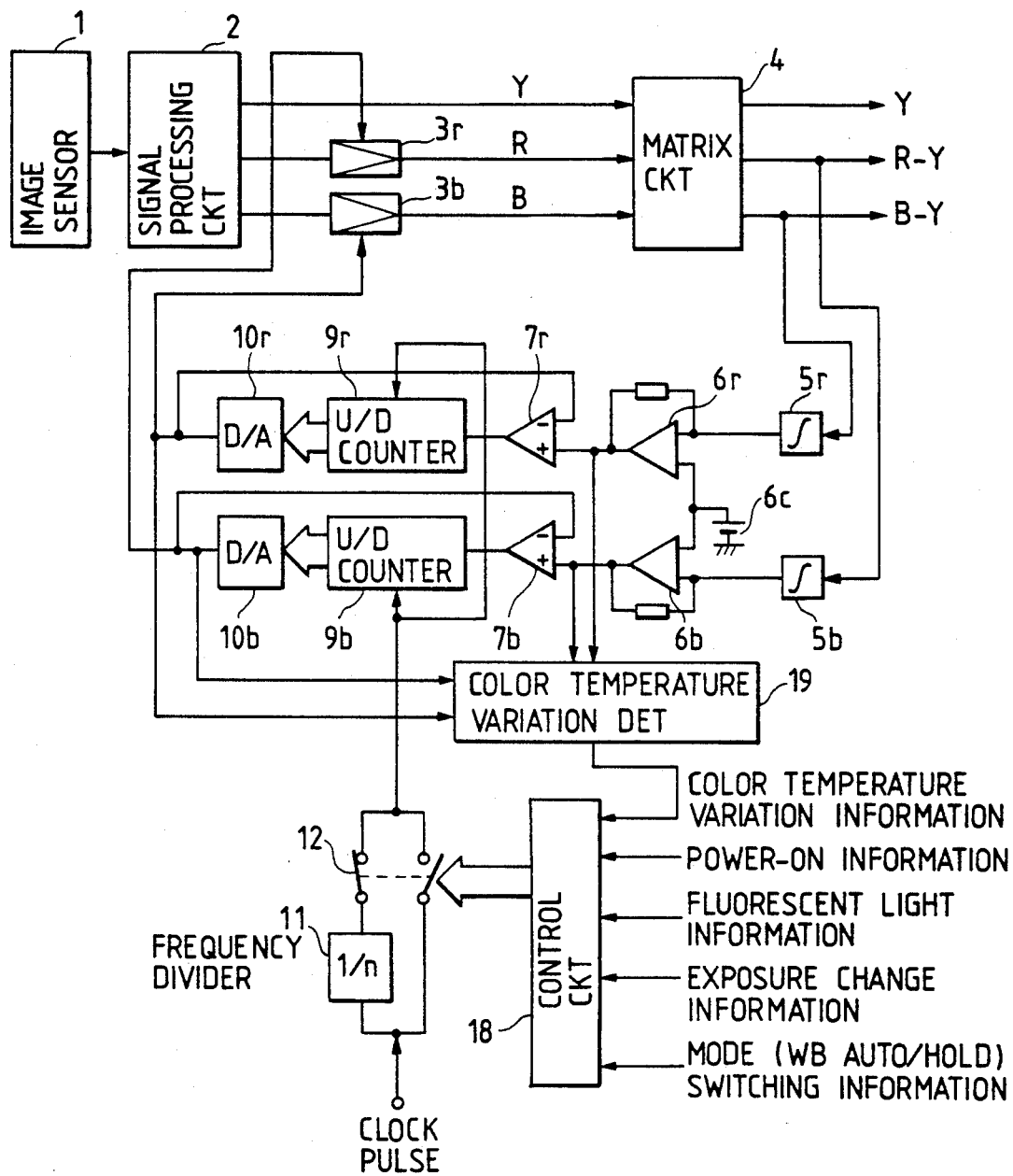
FIG. 1 is a block diagram showing a white balance adjusting system according to a first embodiment of the present invention.

In a white balance adjusting system shown in FIG. 1, an image signal read by an image sensor 1 is separated into a luminance signal and to red and blue color signals R and B at a signal processing circuit 2 of the following stage. Then the luminance signal Y and respective color signals R and B that had gone through variable gain amplifiers 3r and 3b are operated at a matrix 4, generating two color-difference signals R−Y and B−Y. The two color-difference signals that have been generated are integrated for one field period by integration circuits 5r, 5b, respectively. Thus, the average levels of two color-difference signals R−Y and B−Y for one field period are obtained. Operational amplifiers 6r, 6b compare the average levels of the two color-difference signals R−Y and B−Y that have been obtained with a reference voltage 6c, which corresponds to R−Y=B−Y=0, and generate white balance control signals which correspond to the difference between average level and reference voltage for both levels. The white balance control signals that have been generated are ultimately fed back to variable gain amplifiers 3r, 3b in the color signal channel as gain control signals, and the white balance is adjusted so that the average levels of color-difference signals R−Y and B−Y will both become zero. In this embodiment, a memory circuit for white balance control signal comprised of comparison circuits 7r, 7b, up and down counters 9r, 9b and D/A converters 10r, 10b is inserted between the amplifiers 6r, 6b and variable gain amplifiers for color signal gain control 3r, 3b.

Further, it is also acceptable for the structure of this portion to compare the outputs of integration circuits 5r, 5b with reference voltage without using operational amplifiers 6r, 6b and input the results directly to up and down (U/D) counters 9r, 9b, in which case it is not necessary to return the outputs from D/A converters 10r, 10b to comparators 7r, 7b.

At the U/D counters 9r, 9b, count data successively go up and down for each input of driving clock pulse according to the output level (high or low) of comparators 7r, 7b that are supplied to them, and converges on the point where positive and negative inputs of comparators 7r, 7b, i.e. the output level of D/A converters 10r, 10b and white balance control signal level output from operational amplifiers 6r, 6b coincide. While the gain control voltage applied to variable gain amplifiers 3r, 3b for color signal gain control almost coincides under a stationary state with the outputs of amplifiers 6r, 6b after such convergence, the data at the counter will not change even after an instantaneous change in the output of these amplifiers 6r, 6b as long as driving clock pulse is not input. In other words, the response of actual white balance control against changes in white balance control signal can be changed by altering the cycle of the driving clock pulse. As a result, a circuit which alters the drive pulse cycle input to the counter (a frequency divider 11 and a switch 12) is installed in the pulse channel, and alteration of the pulse cycle supplied to the counter at proper time is made possible by a control circuit 18 which controls the variable circuit in the cycle through information from respective detection circuits such as detection of turning-on of power supply.

Whereas, a color temperature variation detection circuit 19 detects abrupt changes while picking up an image. The color temperature variation detection circuit 19 compares the output level of operational amplifier 6r with the output level of D/A converter 10r and outputs a detection signal when it detects an occurrence of difference exceeding a predetermined value between the two levels. Furthermore, this detection circuit 19 also compares the output level of operational amplifier 6b with the output level of D/A converter 10b and outputs a detection signal when it detects an occurrence of difference exceeding a predetermined value between the two levels. In other words, the level of output from color temperature variation detection circuit 19 becomes low when difference exceeding the predetermined level does not exist and high when it does exist. Since the output voltage from D/A converters 10r, 10b only change at the time of each clock pulse input, the difference between the output level of operational amplifier 6r and output level of D/A converter 10r will increase rapidly if an abrupt change in imaging condition (color temperature of illumination) occurs after the convergence of U/D counters 9r, 9b, and the detection signal is given from the color temperature variation detection circuit 19 to the control circuit 18. Accordingly, the control circuit 18 functions in such a way that short-cycle clock pulse will be supplied to the U/D counters 9r, 9b during such abrupt change in imaging condition (the period until the convergence of U/D counter in which difference in output between amplification circuit 6r and D/A converter 10r is great). The situation will be exactly the same when a difference between outputs of amplifier 6b and D/A converter 10b becomes great. When change in imaging condition is small after the convergence of U/D counter (e.g. color temperature variation of about ±1000° K.), the control circuit 18 will function in such a way that long-cycle clock pulse will be supplied to the U/D counters 9r, 9b.

In addition, outputs from integration circuits 5r, 5b can be used instead of the signal to detect change in color temperature. In this case, the white balance is adjusted in such a way that the outputs from these integration circuits 5r, 5b will be equal to the reference voltage which is input to one of operational amplifiers 6r, 6b in the next stage. As a result, the degree of deviation from white can be identified from the difference between outputs of the integration circuits 5r, 5b and the reference voltage.

As adjusting response in accordance with the condition of imaging can be realized through this embodiment, unnecessary fluctuations in color tone caused by malfunctioning of white balance adjusting can be prevented and adjusting time required until convergence can be reduced.

Figure 2:
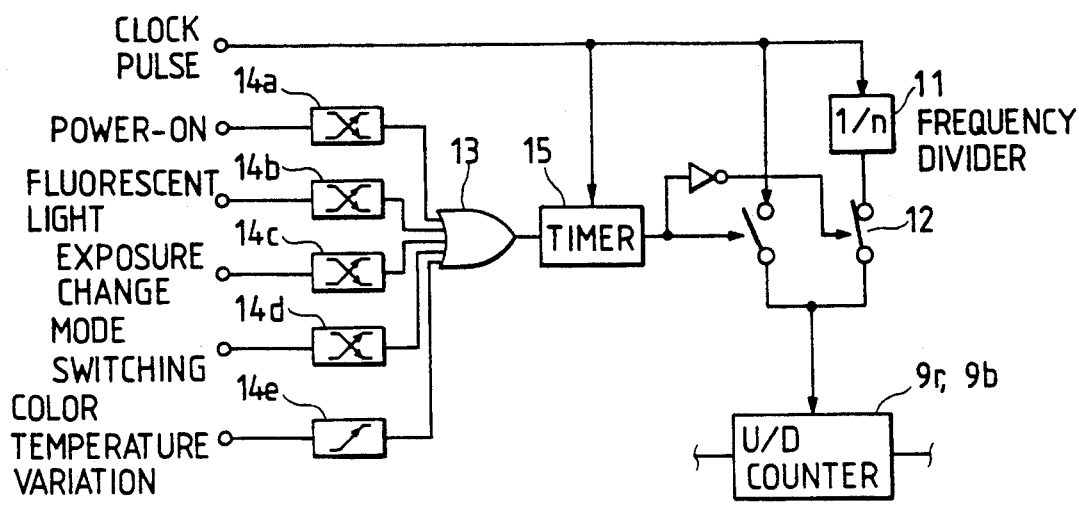
FIG. 2 is a block diagram showing details of a control circuit shown in FIG. 1.

FIG. 2 shows details of an example of the control circuit 18 in the first embodiment. In this example circuit, the counter is operated at a fast clock pulse for a predetermined amount of time after a change occurs in imaging condition, and is shifted automatically to slow pulse operation after this predetermined amount of time has elapsed. As shown in the diagram, leading and trailing edge detectors 14a-14d as well as leading edge detector 14e, which detect changes in level of signal input to control circuit 18 which represents information such as abrupt change in color temperature, input of power, existence of fluorescent light, change in exposure (i.e. change in lens aperture to compensate for changes in luminance), switching between white balance automatic adjusting mode and hold mode (existence of fluorescent light, change in exposure are often accompanied by change in type of illumination, and, in turn, by change in color temperature at light source), are provided at input information terminals, and the outputs of these detectors 14a-14e are connected to a timer 15 via an OR circuit 13 so that even a single change in input information will trigger an input. After the trigger input (occurrence of change in status), the timer 15 will control a double throw switch 12 in such a way that pulses with long cycle (n times the cycle of the clock pulse) which are generated by dividing the clock pulse by the frequency divider 11 will be supplied to the U/D counters 9r, 9b after the clock pulse which does not go through the frequency divider 11, i.e. short cycle pulses are supplied for the predetermined amount of time.

Further, the predetermined amount of time can be as long as the period required for the U/D counters 9r, 9b to count down from the largest value to the smallest value. If a circuit that resets U/D counters 9r, 9b to the median for the largest and smallest values by synchronizing with the leading and trailing detection is added, then the half of that period should be sufficient. Moreover, the measurement motion of timer 15 can be performed through actual time measurement calculated from the bit number of U/D counters 9r, 9b and driving clock pulse cycle, or by calculating the number of clock pulses which are supplied to U/D counters 9r, 9b as shown in the diagram.

According to this example of control circuit, it is effective in securing not only conformity but also stability because, in the white balance adjusting system that possesses a function for varying the following speed as shown in FIG. 1, high-speed motion is started only when there is change in the imaging condition, while the white balance shifts to a low-speed motion after white balance adjusting converges and white balance stabilizes under the new condition.

Figure 6:
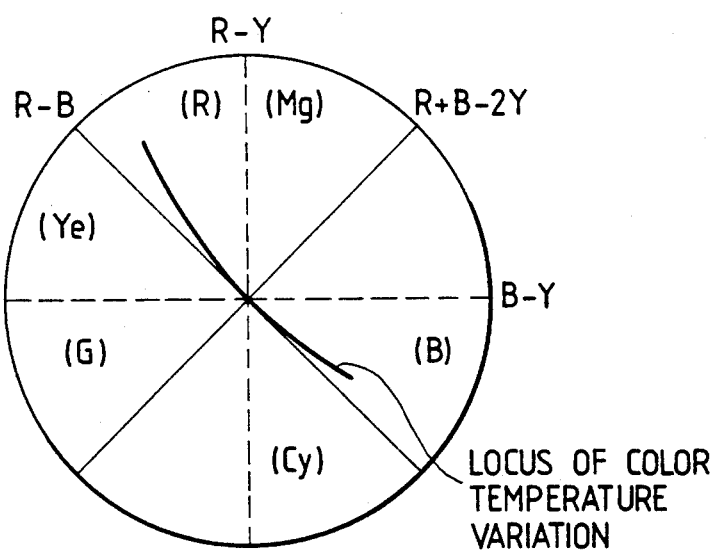
FIG. 6 is a vector diagram of chrominance signal in color television.
Figure 3:
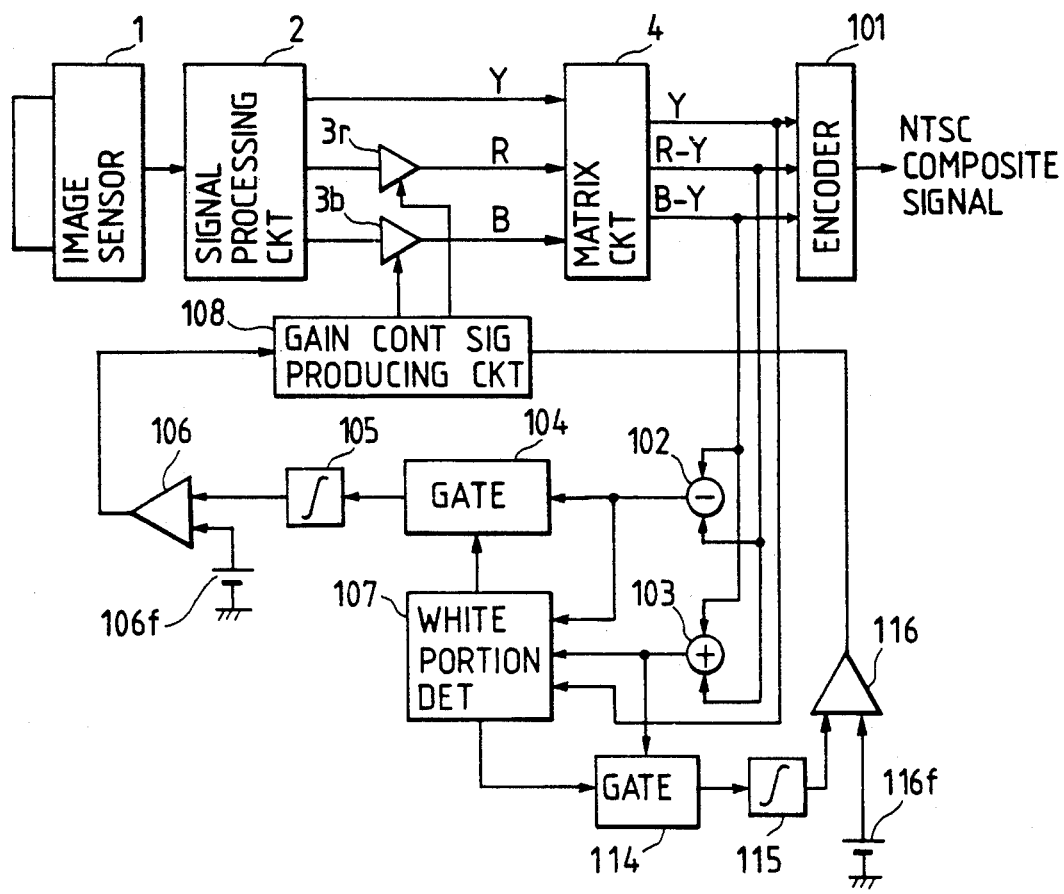
FIG. 3 is a block diagram showing a white balance adjusting system according to a second embodiment of the present invention.

Next, the second embodiment of the present invention will be explained by using FIG. 3. Color-difference signals R−Y, B−Y which are taken out from the output side of matrix circuit 4 are subtracted and added by a subtracter 102 and an adder 103. A color information signal R−B in the direction along R−B line in the vector diagram of FIG. 6 (from red R to blue B) and a color information signal R+B−2Y in the direction along R+B−2Y line (from magenta Mg to green G) in the same vector diagram are generated as a result. The R−B signal shows a deviation from white (the point where R−Y axis and B−Y axis intersect in FIG. 6) due to color temperature variation of light source, while the R+B−2Y signal refers to a deviation from white caused by reasons other than change in color temperature. In the two signals R−B and R+B−2Y, only the signal portions that correspond to the white portion in the picture are taken out at gate circuits 104, 114. These white portion signals turn into averaged signals after the entire picture is integrated by integration circuits 105, 115 for one field period. White balance control signals are generated by comparing such white portion averaged signals R−B and R+B−2Y with reference voltages 106f, 116f at operational amplifiers 106, 116 and obtaining their difference. Further, the reference voltages 106f, 116f which are input to the operational amplifiers 106, 116 correspond to white portion averaged signals R−B and R+B−2Y under the condition in which white balance is attained, respectively. A gain control signal producing circuit 108 generates a signal that controls the gain at variable gain amplifiers 3r, 3b from the outputs of operational amplifiers 106, 116.

Figure 4A:
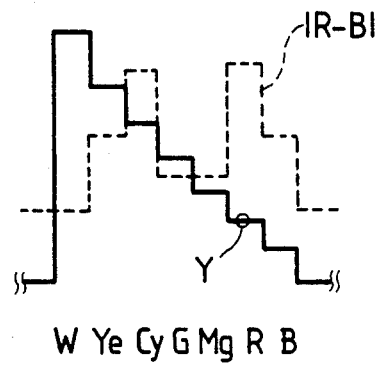
FIGS. 4A and 4B are diagrams showing waveforms of signals that are used in detecting a white portion in the white balance adjusting system shown in FIG. 3.
Figure 4B:
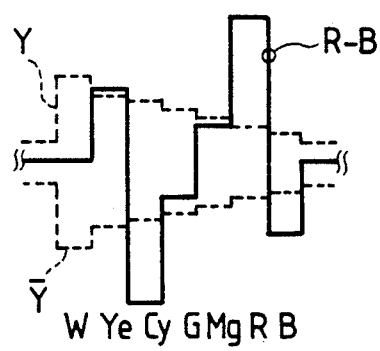

A white portion detection circuit 107, which drives the gate circuits 104, 114 for extracting white portion, detects low color saturation and high luminance portions from the two color information signals R−B and R+B−2Y and luminance signal Y. This detection can be performed either by distinguishing the level of color saturation (e.g. under the burst level) or luminance (e.g. over 30 IRE) according to fixed threshold, or by adopting the following variable, threshold for accurate detection of the white portion. FIGS. 4A and 4B are examples of this. FIG. 4A uses the full-wave rectified R−B signal as threshold for distinguishing the level of luminance signal Y. Since the threshold of luminance which is regarded as white increases for portions with higher color saturation, the precision of detecting a bright chromatic portion is improved. Although the full-wave rectified R−B signal is used here, the same effect can also be obtained by using B−Y, R−Y, R+B−2Y signal or a half-wave rectified component of the signal as variable threshold.

FIG. 4B is an example of using the luminance signal Y with positive and negative polarity as the threshold for distinguishing the level of color information signal R−B. The precision of detecting a bright chromatic portion is also improved in this method because the threshold of color saturation which is regarded as white can be lowered for portions with lower luminance. Needless to say, it will have the same effect when applied to not only the R−B signal but to R+B−2Y, R−Y and B−Y signals as well. Further, the precision of white portion detection is further improved by using the above two methods and fixed threshold detection at the same time.

Figure 5:
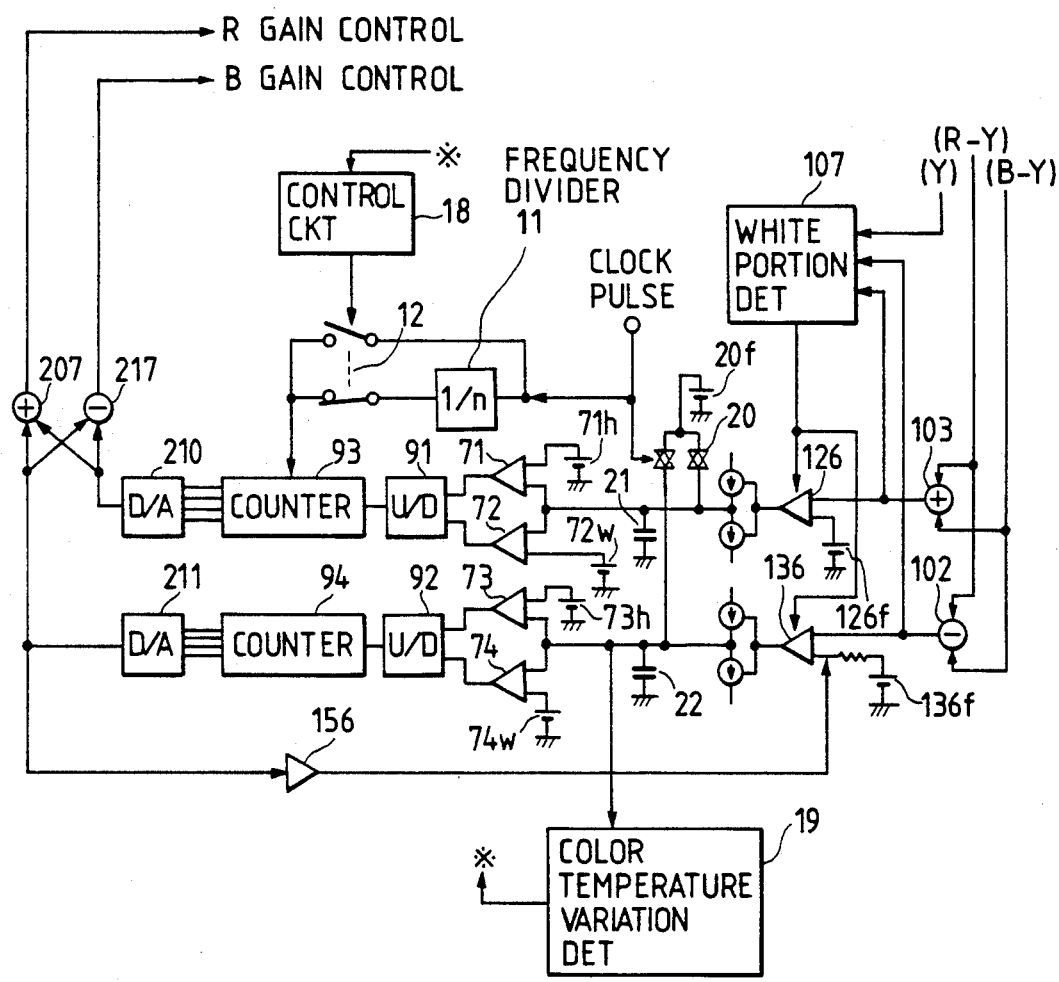
FIG. 5 is a block diagram showing a white balance adjusting system according to a third embodiment of the present invention.

FIG. 5 is used next to explain the third embodiment of the present invention. Image signal processing system is omitted here because it is same as in the first and second embodiments, i.e. FIGS. 1 and 3. The two color-difference signals R−Y, B−Y which have been taken out from matrix circuit 4 (not shown) are subtracted and added by a subtracter 102 and an adder 103, respectively, to generate color information signals R−B, R+B−2Y. Since the R+B−2Y signal is a color information signal which indicates variation in chrominance along the direction of changing from magenta Mg to green G, R+B−2Y signal hereinafter be referred to as Mg−G signal. The two color information signals are supplied to a white portion detection circuit 107, an Mg−G signal integration system, which consists of a current-driven type comparator circuit 126 and an integration capacitor 21, and to an R−B signal integration system which also consists of a current-driven type comparator circuit 136 and an integration capacitor 22.

The white portion detection circuit 107 uses the R−B, Mg−G signals as well as luminance signal Y to detect the white portion in the imaged picture (The detection method of white portion is same as those described in the second embodiment). Control is performed in such as way that the two comparator circuits 126, 136 will operate for these portions that are regarded as white. In other words, current input and output from the two comparator circuits 126, 136 will be zero for portions that are regarded as white or chromatic with white balance, for instance. At the integration capacitor 22, however, period of white with reddish tone is charged in positive direction and period of white with bluish tone is charged in negative direction. At the integration capacitor 21, on the other hand, period of white with purplish tone is charged in positive direction and period of white with greenish tone is charged in negative direction. In addition, these capacitors 21, 22 will synchronize with clock pulse for counter drive and will be reset to a predetermined voltage (e.g. half the value of power source voltage). In other words, the voltage at integration capacitors 21, 22 is reset to reference voltage 20f every time clock pulse arrives because integration capacitors 21, 22 are connected to reference voltage 20f via an electronic switch 20 (which is always turned off when clock pulse is not provided) and the electronic switch 20 is only turned on when clock pulse is given to it for the period of pulse width. For this reason, the voltage at the capacitors 21, 22 just before reset is almost equal to the reset voltage when the entire picture is white and when there is no white in the picture, higher than the reset voltage when the picture is red or purple-oriented on the whole and lower than the reset voltage when the picture is blue or green-oriented. The voltages obtained here [∫white (R−B), ∫white (Mg−G)] are supplied to the subsequent two pairs of comparators 71, 72; 73, 74. Voltages that are slightly higher than the reset voltage (71h, 73h) and slightly lower than the reset voltage (72w, 74w) are applied as reference voltages at these two pairs of comparators. Therefore, U/D control circuits 91, 92 are controlled in such a way that the count will be made upwards when the [∫white (R−B), ∫white (Mg−G)] voltages exceed the reset voltage by a predetermined value, downwards when they fall short of the reset voltage by a predetermined value and stop the count when they are close to the reset voltage. Upon receiving the output signal from U/D control circuits 92, 91, counters 94, 93 for R−B and Mg−G signal channels update data successively for each input of clock pulse. Further, the clock pulse input to these counters synchronize with the reset pulse and are input slightly earlier than the reset pulse. The data at the counter are converted into direct current voltage at digital-analog (A/D) converters 211, 210 of R−B and Mg−G signal channels, respectively, and generate an R gain control signal and a B gain control signal after mutually added and subtracted by an adder 207 and a subtracter 217. The aforementioned motion is carried out at every cycle and converges at the point where the integration capacitor 21, 22 become almost equal to the reset voltage (the point where the proper white balance is in place).

In the event the imaging condition (e.g. color temperature of illumination) changes abruptly from this condition of convergence, the voltage at the integration capacitor 22 will also change abruptly. Since it is possible to shorten the cycle of motion for counters 94, 93 by detecting an abrupt change in this voltage (or the fact that the difference with reset voltage has exceeded a predetermined value) by using a color temperature variation detection circuit 19 and by sending the clock pulse directly to counters 94, 93 instead of putting it through a frequency divider 11 for a predetermined amount of time from the occurrence of this abrupt change (or for a period of time during which the difference with reset voltage has exceeded the predetermined value), it is possible to switch the white balance adjusting motion from normal slow speed to high speed circuit only when abrupt changes occur in imaging condition as in the first embodiment. Furthermore, it is possible to detect changes in type of illumination (e.g. from natural light to fluorescent light) by connecting a detection circuit with the same structure as the color temperature variation detection circuit 19 to the Mg−G signal integration capacitor 21.

The white balance control signal for R−B signal channel (output from D/A converter 211) changes by responding to color temperature of the object that is being imaged and shows a low value under low color temperature, for instance. This control signal is fed back to a reference voltage source 136f of comparator circuit 136 which distinguishes whether the picture has bluish or reddish tone through a feedback amplifier 156, and raises (or lowers) the value of reference voltage which is applied to this comparator circuit 136. This reference voltage 136f corresponds to the signal level of white portion under proper white balance. Since this white balance adjusting system operates in such a way that the white portion of R−B signal which is input to the comparator circuit 136 will coincide with the reference voltage, the point of convergence for this system will also shift accordingly by shifting this reference voltage. Meanwhile, feeding back the white balance control signal during low color temperature (when the picture has a reddish tone) will displace the reference voltage (point of convergence) towards red. This effort will offer an effect equivalent in value to actually lowering the loop gain and lowers the precision of this system converging in white. Furthermore, selecting a proper rate of the feedback will enable a free set up of precision for converging in white.

By using the present invention, it will be possible to turn the area near the point of convergence at a white balance adjusting system using digital counter into an insensitive zone. Since count data and white balance control signal will be put on hold at this time, unnecessary white balance adjusting near the point of convergence is terminated and stable image with little color tone fluctuation can be obtained. Moreover, adjustment of precision for converging in white will allow for a set up that will leave a slight reddish tone during low color temperature, thereby providing an image which is sensitively natural (color reproduction).

In addition, setting the white balance reference point at a high level (5000° K. or higher, e.g. 8000° K.) in addition to the above low precision setting will normally result in a reddish image with warm color tone.

Since the present invention will enable high speed control at the time of change in imaging condition and when it is necessary, response performance against moving of imaging location and abrupt changes in illumination will be improved.

Further, it is effective in preventing fluctuations in color temperature detecting conditions due to change in picture angle and necessary motion due to the impact of a moving object because is it capable of low speed control during stationary state and when it is necessary.

In addition, it offers a more reliable extraction of white color portion because it enables adequate white distinction against colors with various properties.

Moreover, it is effective in improving stability because adjusting motion is paused automatically when it is necessary.

Furthermore, it is effective in realizing natural image or color reproduction by expanding the freedom in the set up of white balance adjusting properties.

What is claimed is:

1. A white balance adjusting system for a color image pickup apparatus comprising:
    means for detecting a deviation from white in a picture picked up based on an image signal supplied from an image sensor and generating a white balance control signal based on the results of detection;
    means for holding data which correspond to the white balance control signal that has been generated and successively updating the data to be held based on a synchronization signal which is applied successively thereto;
    means for controlling a gain of color signal in the image signal based on the data held by said means for holding;
    means for generating a detection signal when difference exceeding a predetermined value exists by detecting a difference between a level of said white balance control signal and a level expressed by the data held by said means for holding; and
    means which shortens the cycle of said synchronization signal applied to said means for holding for a predetermined period of time.

2. A system according to claim 1 wherein said means for holding is a counter which is counted up or down according to increase or decrease in said white balance control signal.

3. A system according to claim 2 further comprising means for controlling said counter so that said counter does not respond to increase or decrease in the level of said white balance control signal within a predetermined range.

4. A system according to claim 3 wherein said means for controlling said counter consists of two comparator circuits which output signals that control count up or count down of said counter, and said white balance control signal is applied to one of input terminals of each of the two comparator circuits while reference voltages of different values are supplied to the other of input terminals, and the range of said white balance control signal level in which said counter does not respond is determined by the difference in values of said reference voltages.

5. A system according to claim 1 further comprising means for feeding back a signal corresponding to said data held by said means for holding to said means for detecting the deviation from white, and means for changing a white balance reference point for detecting deviation from white based on the fed-back signal.

6. A white balance adjusting system for a color image pickup apparatus comprising:
    means for detecting a white portion in a picture based on a color information signal (R−B, R+B−2Y) and a luminance information signal (Y) of a picture picked up by an image sensor by use of a variable threshold;
    means for extracting a signal portion which corresponds to the white portion from the color information signal of the picture based on the detection signal supplied from said means for detecting a white portion;
    means for detecting a deviation from white in a picture picked up based on the white portion signal that has been extracted and generating a white balance control signal based on the results of detection; and
    means for controlling a gain of color signal in an image signal which expresses the picture based on the white balance control signal that has been generated.

7. A system according to claim 6 wherein the variable threshold for detecting said white portion from said luminance information signal is generated from said color information signal.

8. A system according to claim 6 wherein the variable threshold for detecting said white portion from said color information signal is generated from said luminance information signal.

9. A white balance adjusting system for a color image pickup apparatus which includes an image sensor, a signal processing circuit that generates a luminance signal (Y), a red color signal (R) and a blue color signal (B) from a picture signal supplied from the image sensor, a first variable gain amplifier that amplifies the red color signal (R), a second variable gain amplifier that amplifies the blue color signal (B), and a matrix circuit that generates two color-difference signals (R−Y, B−Y) from the red color signal (R) which is output from the first variable gain amplifier, the blue color signal (B) which is output from the second variable gain amplifier and the luminance signal (Y) which is output from the signal processing circuit, said system comprising:
    subtraction means for generating a signal of remainder (R−B) of the two color-difference signals (R−Y, B−Y);
    addition means for generating a signal of sum (R+B−2Y) of the two color-difference signals (R−Y, B−Y);
    means for detecting a white portion in a picture that has been picked up based on two signals among the remainder signal (R−B), the sum signal (R+B−2Y) and the luminance signal (Y);
    means for extracting a signal portion that corresponds to the white portion from said remainder signal based on the detection signal supplied from said means for detecting the white portion;

means for extracting a signal portion that corresponds to the white portion from said sum signal based on the detection signal supplied form said means for detecting the white portion;

means for generating an averaged remainder signal by integrating the remainder signal of the extracted white portion;

means for generating an averaged sum signal by integrating the sum signal of the extracted white portion;

means for generating a first white balance control signal by comparing the averaged remainder signal with a reference voltage;

means for generating a second white balance control signal by comparing the averaged sum signal with a reference voltage;

means for generating gain control signals that control gains of said first and second variable gain amplifiers from the first and second white balance control signals, respectively;

wherein one of the two signals selected from said remainder signal (R−B), said sum signal (R+B−2Y) and said luminance signal (Y) is used as threshold for detecting the white portion from the other signal.

10. A system according to claim 9 wherein said remainder signal (R−B) is used as threshold for detecting the white portion from said luminance signal (Y).

11. A system according to claim 9 wherein said luminance signal (Y) is used as threshold for detecting the white portion from said remainder signal (R−B).

* * * * *